Figure 1:
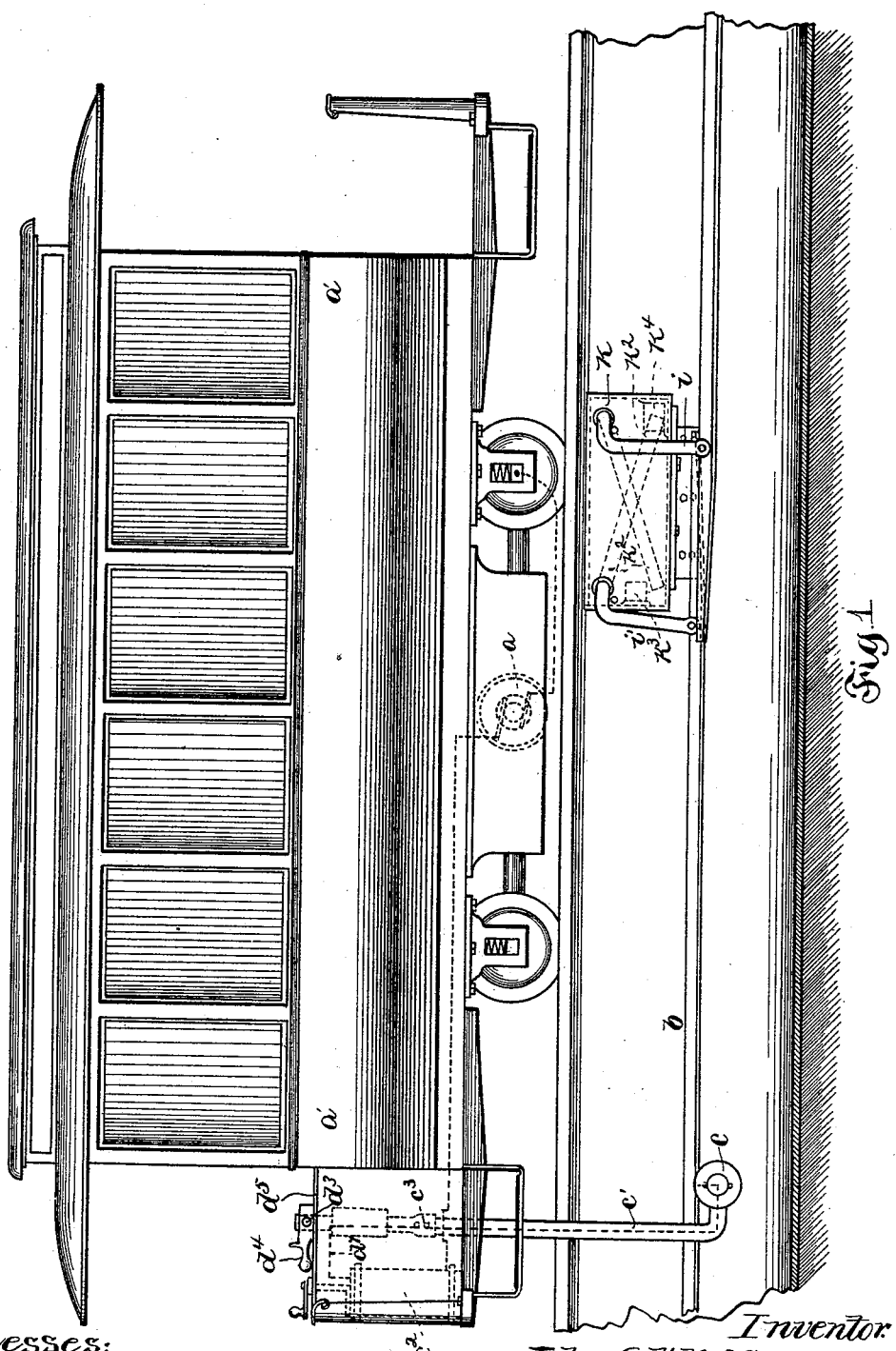

(No Model.) 3 Sheets—Sheet 1.
J. A. K. McGREGOR.
INCLOSED CONDUCTOR FOR ELECTRIC RAILWAYS.
No. 500,506. Patented June 27, 1893.

Witnesses:
George L. Cragg.
R. Hill.

Inventor.
John A. K. McGregor.
By Barton & Brown
Attys

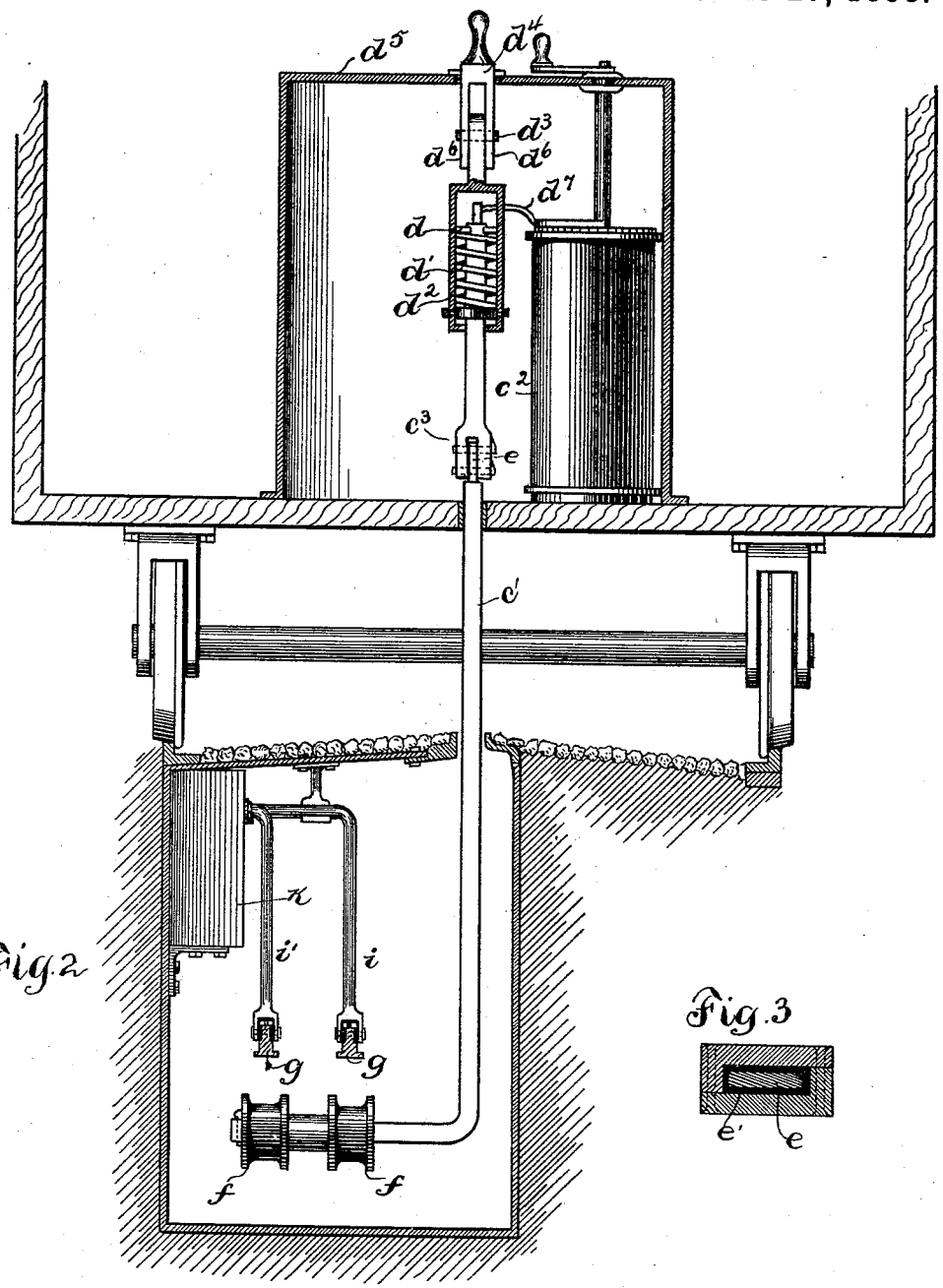

(No Model.) 3 Sheets—Sheet 3.
J. A. K. McGREGOR.
INCLOSED CONDUCTOR FOR ELECTRIC RAILWAYS.
No. 500,506. Patented June 27, 1893.
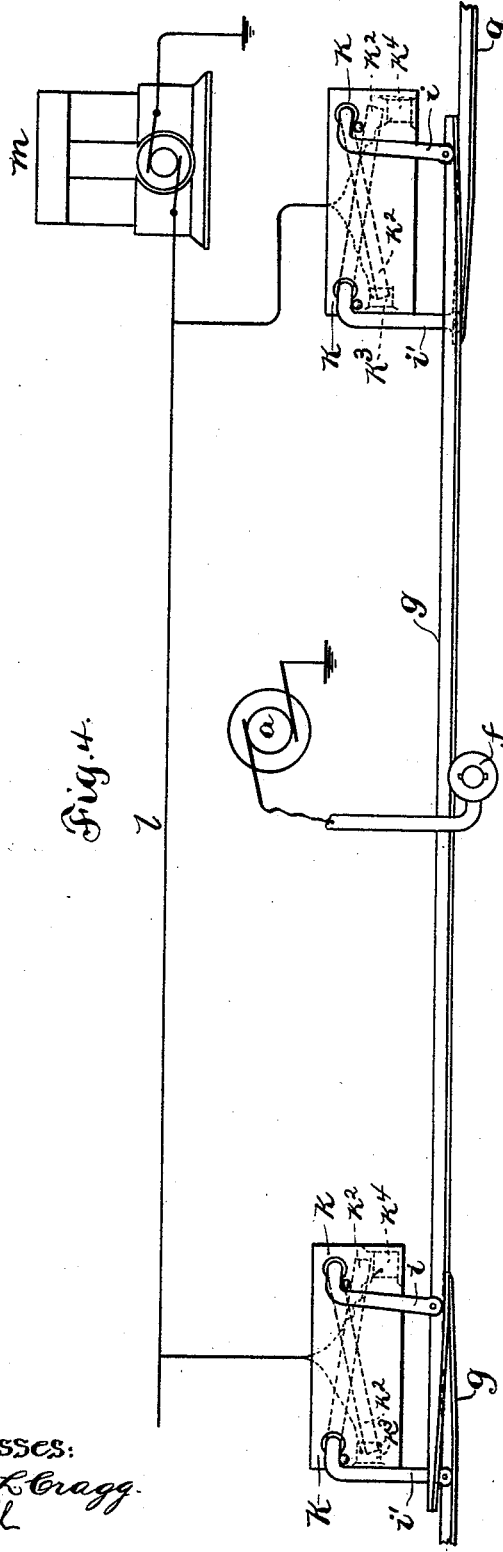
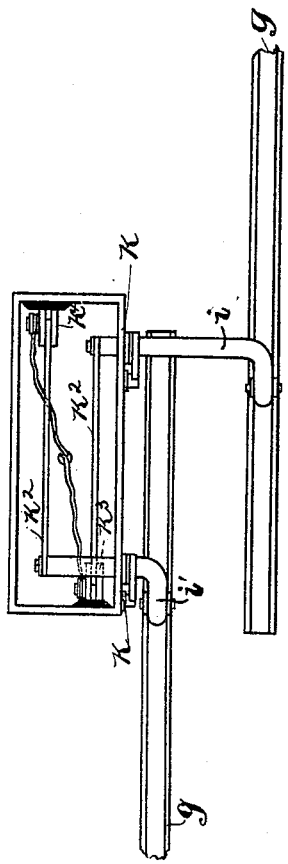
Witnesses:
George L. Cragg
R. Hill
Inventor:
John A. K. McGregor.
By Barton + Brown
att'ys

UNITED STATES PATENT OFFICE.

JOHN A. K. McGREGOR, OF CHICAGO, ILLINOIS, ASSIGNOR OF ONE-FOURTH TO HOMAN R. POWERS, OF SAME PLACE.

INCLOSED CONDUCTOR FOR ELECTRIC RAILWAYS.

SPECIFICATION forming part of Letters Patent No. 500,506, dated June 27, 1893.

Application filed March 19, 1892. Serial No. 425,557. (No model.)

*To all whom it may concern:*

Be it known that I, JOHN A. K. MCGREGOR, a citizen of the United States, residing at Chicago, in the county of Cook and State of Illinois, have invented a certain new and useful Improvement in Underground Electric Systems, (Case No. 1,) of which the following is a full, clear, concise, and exact description, reference being had to the accompanying drawings, forming a part of this specification.

My invention relates to systems of underground electric traction for railways and it has for its object the provision of reliable means for automatically connecting into circuit with an electric generator, sections of the conductor over which the car is passing, said sections being automatically switched out of circuit again when the car has passed on to the next section of track. The electric circuit is thus exposed only as the sections on which the car may be passing or standing.

My invention consists of a special form of switch and switch chamber and in the method of suspension of the sectional conductor in combination with the double trolley adapted to make contact with said sectional conductors and carry the current to the motor upon the car, and at the same time to operate the switches at the junctions of the sections.

The accompanying drawings illustrate my invention.

Figure 1 is a side elevation of a car with the apparatus of my invention in place, showing a diagram of the electric circuits connected therewith. Fig. 2 is an end elevation of a portion of a car partly in section with an end elevation of the apparatus of my invention in place. Fig. 3 is a sectional view of the trolley arm. Fig. 4 is a diagrammatic illustration of my invention with its electrical circuits. Fig. 5 is a top view of the special switch which I use, with the cover removed.

Similar letters of reference indicate similar parts throughout the different views.

Through the motor $a$ upon the car $a'$ the circuit passes to the wheel of the car and thence to ground through the rail in the well known way, as shown by the dotted line in Fig. 1. The circuit from the conductor $b$ is through the trolley $c$ and its arm $c'$ to the rheostat $c^2$ and to the motor as also shown by the dotted line in Fig. 1. The rheostat is of well known construction adapted to control the amount of current delivered to the motor, and as it does not constitute an essential feature of my invention, it does not need further description.

The trolley arm $c'$ is linked and electrically connected at $c^3$ by two pins which may be withdrawn, thus allowing the lower part of the trolley arm to pass below the floor of the car platform and permitting the car to pass on. The trolley arm is supported by the stop $d$ which rests upon the coiled spring $d'$ supported within a cylinder $d^2$. This cylinder $d^2$ is supported upon the pin $d^3$ which rests in bearings in the forked handle $d^4$ and serves as a pivot upon which such handle turns. This construction of the handle enables the operator to raise the trolley arm until the trolley is in contact with the conductor. The frame or casing $d^5$ through which said handle passes is provided with an opening which permits the handle to pass freely when held vertically. When the handle is raised until its forked members $d^6 d^6$ entirely emerge, the handle may be turned and will thus rest upon the top of said casing as shown in Fig. 1. The trolley is then supported upon the trolley arm which is given an elasticity by means of the coiled spring, thus compensating for any irregularities in the track or in the height of the rail, and always insuring a good though yielding contact between the trolley and the conductor. By the conductor $d^7$ I connect the trolley arm with the rheostat.

I preferably make the trolley arm of an inside conductor $e$ surrounded by some suitable insulating substance $e'$, outside of which I put a casing preferably of iron as an armor for same. I have shown in Fig. 3 a form of casing which I prefer to use on account of its convenience and cheapness. It consists of two L shaped pieces of iron placed together to form a case surrounding the insulated trolley conductor.

The two trolleys $f$ $f$ are both connected electrically with the trolley conductor, but each one is mounted so as to rotate separately upon the end of the trolley arm which is extended at right angles to said arm. These trolleys are so placed that they engage with two series of conductors placed parallel with each other. These series of conductors $g\ g$ are in sections. The end of each section of one series overlaps the end of the next succeeding section of the adjoining series as shown in Figs. 4 and 5. The ends of each section are cut away, as shown, in such a manner as to insure the contact of one trolley with each succeeding section before the other trolley has left the preceding section of the adjoining series. This construction also prevents the sectional conductors making a too abrupt contact with the trolley. As the two series of conductors are supplied with current successively through the switches from the main feed wire $l$ as hereinafter described, it is obvious that the interior conductor of the trolley arm is constantly supplied with current through one or the other of the trolleys.

The sectional conductors are suspended upon the hollow arms $i\ i'$, which I preferably make of gas pipe and through which I lead conducting wires to be attached to the sectional conductors. These arms are hung in bearings in the casing $k$ which incloses the junction switch, and they carry on the extremities inclosed within said junction boxes the switch arms $k^2\ k^2$ adapted to make contact with the contact plates $k^3\ k^4$, with which the main lead wire is connected. I preferably split these contact points and fit the switch arm to make contact by pressing into the space between the two split portions, thus insuring a positive contact of low resistance.

The bearings in which the arms $i\ i'$ rest in the junction switch casing I preferably make somewhat thicker than the rest of the casing so as to give the arm a broader bearing surface. By making the arms $i\ i'$ fit snugly in these bearings and by thoroughly sealing the chamber inclosing the switch contacts I make the junction box moisture proof so that it may be placed in any position no matter how exposed, without impairing the operation of the switch.

The arms $i\ i'$ are bent in such manner that any motion of the end attached to the conductor in a vertical direction will result in a rocking motion of the arm in its bearing. I preferably bend the arm twice at right angles as shown to accomplish this.

It will be observed that the switch levers attached to arms $i\ i'$ are adapted, one to make contact with switch plate $k^3$, by an upward movement, the other to make contact with switch plate $k^4$ by a downward movement. One series of conductors I attach to arms $i'\ i'$. The other series of conductors I attach to arms $i\ i$. The connection between the arm and the conductors is insulated in any suitable way. The switch levers $k^2\ k^2$ are rigidly but detachably connected to the extremity of the arms $i\ i'$ inclosed within the junction box. The connection between the main lead wire $l$ and the switch connecting plates $k^3$ and $k^4$ are made by insulated wires, and the contact plates themselves are suitably insulated from the case inclosing switch mechanism.

I will now proceed to describe the operation of this apparatus: Referring to Fig. 4, the current is led from the dynamo $m$ over the main lead wire $l$, from which branches lead to the contact plates $k^3\ k^4$ of the switch. The trolley $f$ bearing against the conductor $g$ raises this conductor sufficiently to rock the arm $i$ in its bearing, thus closing the switch lever $k^2$ with contact $k^3$. The current then passes from the dynamo through the main lead wire and by branch wire to the contact plate, and thence by the switch arm and the conductor in the interior of the arm $i$ to the sectional conductor $g$, whence it is taken up by the trolley and delivered to the motor on the car. As the trolley $f$ passes the junction box, the other trolley of the pair comes in contact with the sectional conductor of the adjoining series, and on doing so, lifts the conductor, thus rocking the arm $i$ in its bearing and bringing switch lever $k^2$ in contact with plate $k^4$. It will be observed that the construction of this apparatus is such that the trolley passes to, makes contact with, and raises the next succeeding sectional conductor before dropping the conductor which it is about to leave. This construction prevents arcing at the contact points. The circuit of any section is not opened until the circuit is closed through the next succeeding section.

The construction which I have adopted which consists in suspending the sectional trolley conductors so that they will swing in vertical planes coinciding with their lengths and so that motion imparted to said sections, either in a longitudinal or vertical direction, will be made operative in closing a switch connecting said sectional conductor with the supply wire leading from the conductor, while the weight of said sectional conductor operates to keep said switch normally open, is new I believe. I also believe that it is original with me to make a trolley conductor in sections suspended so that they will swing through arcs of circles in vertical planes coinciding with their lengths, and while this construction is specially applicable to the system which I have described herein, in which said swinging sections operate a switch for the purposes set forth, I do not wish to limit my invention to that particular combination.

Having thus described my invention, what I claim as new, and desire to secure by Letters Patent, is—

1. A trolley conductor comprising sections suspended upon swinging arms adapted to move in vertical planes coinciding with the planes of said sections, said sections being placed in parallel overlapping series; substantially as described.

2. A switch in combination with the supply conductor and a horizontal trolley wire section, said section being adapted to be raised by the trolley passing under the same and a swinging arm or support extending from the switch to the section, said support being adapted to close the switch to make connection with the supply conductor when the section is raised, substantially as specified.

3. The combination in an electric railway system, of the supply conductor with a trolley conductor, said trolley conductor consisting of two parallel series of sections, each section of the different series overlapping the preceding and next succeeding sections of the adjoining series, and a trolley having two sheaves or rollers mounted on the same shaft and connected with a common conductor leading to the car, said sheaves being adapted each to press against the sections of a particular one of the series.

4. In an electric railway the combination with a sectional trolley conductor suspended upon swinging arms and adapted to move in a vertical plane coinciding with its length of switches adapted to be operated by said arms, whereby motion imparted to said conductor in a longitudinal or vertical direction results in connecting said conductor into circuit with a supply wire leading from a generator, while the weight of said conductor operates to keep the switch normally open, substantially as described.

5. In an underground electric conduit system the two series of sectional conductors suspended upon swinging arms adapted to move in vertical planes coinciding with the planes of said sectional conductors in combination with trolleys adapted to engage successively with said sectional conductors, and to automatically operate a switch, and said switch which operates to close the circuit through each succeeding section of the conductor before it opens the circuit through the preceding section, substantially as described.

6. In an underground electric conduit system, sectional conductors arranged in adjoining series of sections, each section overlapping the next preceding and succeeding sections of the adjoining series and suspended upon rocking arms to which are connected switch levers adapted to make contact with the plate connected with the main lead wire whereby when said sectional conductor is raised, connection between the sectional conductor and the main lead wire is made, substantially as described.

7. In an underground electric conduit system, the junction box adapted to connect the main circuit successively to the sectional conductors in combination with swinging arms adapted to move in vertical planes coinciding with the planes of said sectional conductors and to support the said sectional conductors, said sectional conductors being normally out of connection with the main lead wire, but being adapted to be brought into connection therewith by being raised or swung by a trolley attached to the car, and to be restored to its normal position upon the trolley leaving said section, substantially as described.

8. In an underground electric conduit system, the combination with the generator of the main circuit leading therefrom, said main circuit being branched to junction boxes which are adapted to close the circuit between said main lead wire and sectional conductors suspended upon arms which have bearings in the sides of said junction boxes and are adapted to rock therein, said sectional conductors adapted to be moved in a vertical plane through the arc of a circle when lifted by a trolley attached to the car, whereby said main circuit is connected successively through the sectional conductors with which the said trolley is in contact, thence through the trolley to the motor upon the car, and thence to ground, the other sections of the conductors not being in the circuit, substantially as described.

9. In an electric underground system, the combination with sectional conductors overlapping a short distance at their ends and lying alternately in two parallel lines, of independent trolley wheels adapted to travel one along each of said lines and to alternately make connection with the sections of said lines, said trolley wheels being both electrically connected with a trolley arm adapted to lead the current to a motor placed upon the car, whereby said trolley wheels may engage sections upon the two lines alternately to supply a continuous current to the motor; substantially as described.

In witness whereof I hereunto subscribe my name this 8th day of March, A. D. 1892.

JOHN A. K. McGREGOR.

Witnesses:
M. J. TALLETT,
G. L. CRAGG.